United States Patent [19]
Behrens et al.

[11] Patent Number: 4,884,691
[45] Date of Patent: Dec. 5, 1989

[54] DEVICE FOR STORING A DATA DISKETTE IN A FILE FOLDER

[75] Inventors: Dietmar Behrens, Dusseldorf; Waldemar Hoog; Rudolf Zimmermann, both of Wuppertal, all of Fed. Rep. of Germany

[73] Assignee: Elba-Ordner-Fabrik Kraut & Meienborn GmbH & Co., Fed. Rep. of Germany

[21] Appl. No.: 180,363

[22] Filed: Apr. 11, 1988

[30] Foreign Application Priority Data

Apr. 15, 1987 [DE] Fed. Rep. of Germany ....... 3712803

[51] Int. Cl.⁴ ............................................. B65D 85/30
[52] U.S. Cl. .................................... 206/444; 206/311; 206/425; 206/456; 206/488; 211/40; 312/14
[58] Field of Search ............... 206/387, 444, 309, 311, 206/472, 477, 482, 425, 488, 455, 456; 312/12, 13, 14; 211/40

[56] References Cited

U.S. PATENT DOCUMENTS

| | | |
|---|---|---|
| 3,746,180 | 7/1973 | Spiroch et al. . |
| 4,119,200 | 10/1978 | Cassidy et al. . |
| 4,236,635 | 12/1980 | Namiki ............................ 206/456 |
| 4,333,568 | 6/1982 | Weldin . |
| 4,375,850 | 3/1983 | Smyth et al. . |
| 4,465,327 | 8/1984 | Westley ......................... 206/387 X |
| 4,518,275 | 5/1985 | Rauch, III et al. . |
| 4,533,049 | 8/1985 | Ozeki ............................. 206/455 |
| 4,664,258 | 5/1987 | Eichner . |
| 4,667,819 | 5/1987 | Lu .................................. 206/311 X |
| 4,676,374 | 6/1987 | Wilkins ........................... 206/444 |
| 4,691,826 | 9/1987 | Ozeki ............................. 206/456 |
| 4,698,714 | 10/1987 | Sugawara et al. ............. 206/444 X |
| 4,724,956 | 2/1988 | Ozeki ............................ 206/456 X |

FOREIGN PATENT DOCUMENTS

| | | |
|---|---|---|
| 0177435 | 9/1985 | European Pat. Off. . |
| 0160192 | 3/1986 | European Pat. Off. . |
| 0190546 | 8/1986 | European Pat. Off. ............ 211/40 |
| 2027379 | 12/1971 | Fed. Rep. of Germany . |
| 3512823 | 10/1986 | Fed. Rep. of Germany . |
| 1207387 | 2/1960 | France . |

OTHER PUBLICATIONS

IBM Technical Disclosure, vol. 29, No. 1, Jun., 1986, "Diskette Jacket".

Primary Examiner—Bryon P. Gehman
Attorney, Agent, or Firm—Jones, Askew & Lunsford

[57] ABSTRACT

A holder for retaining and storing individual data diskettes, especially 3½ inch diskettes. The holder defines a receptacle that secures the diskette along three side edges, and in the direction normal to the plane of the diskette. A binder on the side edge of the holder includes holes for inserting the device in a file folder. The device includes a flat resilient pressure element pressing against one side of the diskette, and a holding catch facing the pressure element so as to engage complimentary recesses in the confronting side of the diskette. Side connecting devices are formed on opposite sides of the devices, for interconnecting several such devices.

10 Claims, 7 Drawing Sheets

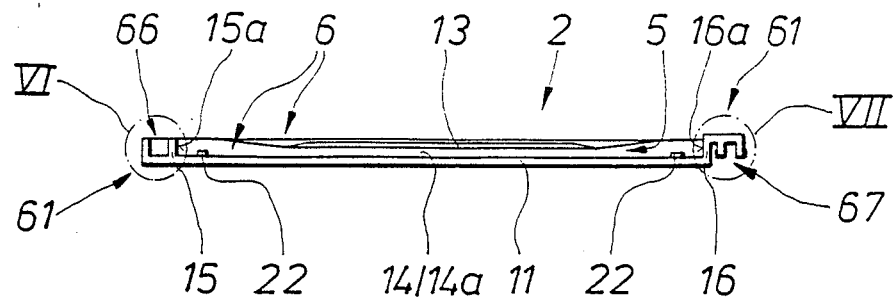
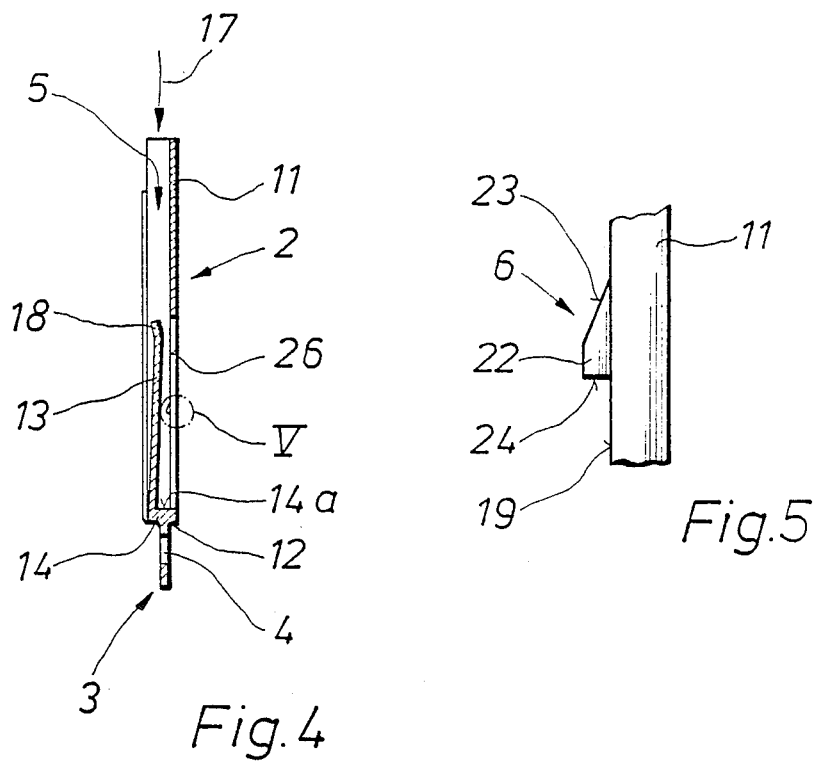
Fig. 3
Fig. 4
Fig. 5

DEVICE FOR STORING A DATA DISKETTE IN A FILE FOLDER

The present invention concerns a device for storing data diskettes, especially 3½ inch diskettes in filing systems, file folders, etc., consisting of a flat holder part for the diskette and a margin with notebook binder holes on a side edge of the holder part, and the holder part has a frame that secures the diskette in the direction of three side edges and also in the direction normal to the plane of the diskette as well as holding devices for securing the diskette in the receptacle.

Such a device is known from German Pat. (OLS) No. 3,512,823. The holder part of this device consists of a file page made of a plastic film with holes on the binder side so the film can be bound in a file folder. At the lower edge of the front side of the file sheet which is in the DIN A4 format, there is a pocket-like holder connected to the file folder sheet and made of the same material, so it is open to the top and in the direction of the holder on the opposite side, and there is one of these pocket holders on the side of the margin for binding and another on the side opposite this margin. Together these holders form a receptacle that secures a diskette that is inserted into the holders from above to prevent it from moving down or in the lateral direction. For additional securing of the diskette, a mounting device is provided in the form of a disk secured in the middle area of the file binder sheet above the holders, and this disk can move in a direction normal to the file finder sheet by means of a connecting piece formed by a free cut that is partially ring shaped. The disk is intended to engage in a hole that is provided for the disk drive of the diskette and thus provide an additional way to secure the diskette in such a way as to prevent it from unintentionally slipping out of the receptacle formed by the pocket-like holders. The holding devices of the known system are suitable only for diskettes that have a central hole, i.e., especially not for diskettes where the magnetic plate is in a flat housing and where only one-half of the housing has an opening for insertion of a driver for the magnetic disk while the other housing half remains closed, apart from a scanning opening as is the case with 3½ inch diskettes (so-called micro floppy disks), for example. Consequently, such diskettes can be inserted into the receptacle of the known device, but it is also possible for the diskette to accidentally slip out of the receptacle, in which case the disk has an interfering effect because it is pressed downward out of the plane of the page by the diskette.

European Patent Publication No. 0,190,546 describes a receptacle device for orderly storage of disk-shaped articles such as photograph records, diskettes, magnetic tape cassettes, etc. This receptacle device consists of a box-shaped receptacle container into which individual independent holders designed as plug inserts can be inserted in such a way that each of them is mounted so it can pivot independently in the container. The plug inserts each consist of a holding pocket that is inserted with one plug part into mounting slots in the container bottom. The plug inserts then receive the articles for storage in their holding pockets. Apart from the fact that the plug inserts do not have margins with holes, they are still not suitable for binding in file folders, etc., because the articles are simply inserted into the pockets from above but they are not secured there. Consequently, the articles can also slip out of the holders unintentionally again in this version.

The present invention is based on the goal of improving the state of the art described initially by providing a device for storing diskettes in file folders, etc., so even diskettes without holes, especially 3½ inch diskettes, can be held securely, while nevertheless these storage holders should be simple to handle as well as inexpensive to manufacture.

This goal is achieved according to this invention by the fact that the holding devices are designed in such a way that they secure the diskettes with a snap action and/or a clamping effect. In a first version of this invention, the holding devices are designed as locking cams that engage into recesses and/or indentations in the diskette. As an alternative or in addition to this, it is also possible according to this invention for the holding devices to be designed as holders that surround the diskette at one edge and clamp it. This makes the device according to this invention especially suitable for storing any diskettes, but of course the dimensions of the receptacle can be adapted to the size of the given type of diskette to be stored. The device according to this invention is especially economical to manufacture when the holder part with the binder margin is designed as a one-piece injection molded or compression molded plastic part. Additional advantageous features of this invention are contained in the subclaims as well as the following description.

This invention will now be explained in greater detail below on the basis of several practical examples illustrated in the figures.

FIG. 3 shows a top view in the direction of arrow III according to FIG. 2.

FIG. 4 show a sectional view along line IV—IV according to FIG. 1.

FIG. 5 shows an enlarged view of detail V according to FIG. 4.

Figure 1:
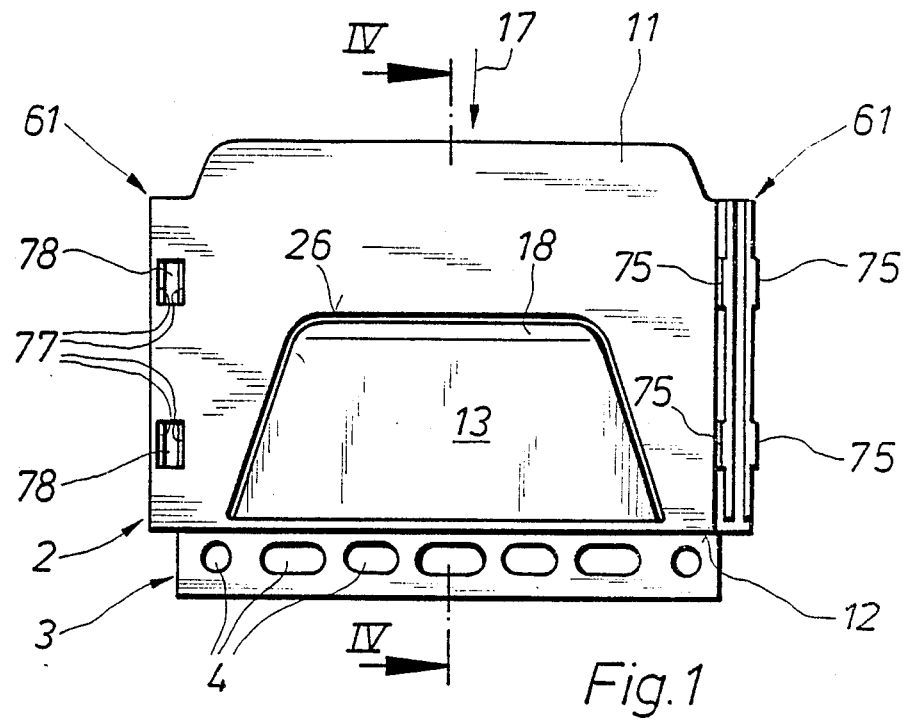
FIG. 1 shows a top view of the rear side of a first version of a device according to this invention for storage of diskettes.

The device according to this invention for storing a diskette 1 (see FIGS. 8, 9 and 14) in all the versions shown as examples here consists of a flat holding part 2 for the diskette 1 and a margin 3 with holes 4 on a side edge of holder part 2. The holes 4, i.e., the arrangement of individual binder holes, are generally known and are not the subject of the present invention.

According to this invention, the holder part 2 is designed with the margin 3 as a one-piece injection or compression molded plastic part. Therefore, the device according to this invention is so rigid or stable that it can exert a protective or supporting function for the mechanically sensitive diskette. Furthermore, it assures that the diskette will be held very securely because a high elastic clamping force can be implemented.

The holder part 2 has a receptacle 5 that secures the diskette in the direction of three side edges as well as in the direction normal to the plane of the diskette and on one side has an insertion opening for diskette 1, and there are also holding devices 6 for securing diskette 1 in receptacle 5. Binder margin 3 according to this invention is arranged on the side edge of the holder part 2 opposite the insertion opening of receptacle 5 and across, especially at right angles to, the direction of insertion of diskette 1, thus yielding a very good method of access to the diskette. In other words, when the device according to this invention is clamped in a file folder, the diskettes can be inserted and removed from the side.

The specific versions of the holder part 2, receptacle 5 and holding devices 6, which differ in the individual practical examples of this invention, are explained in greater detail below.

In the first version of the device according to this invention as shown in FIGS. 1 to 7, the holder part 2 consists of a flat supporting plate 11 which is essentially rectangular and is connected in one piece to margin 3. Contrary to the version shown here (see especially FIG. 4), whereby margin 3 is connected to the supporting plate 11 by way of a step 12, it is also within the scope of this invention to have supporting plate 11 and margin 3 designed so they are flush with each other and lie in one plane. Holder part 2 also consists of a flat resilient elastic pressure element 13 that is approximately parallel to supporting plate 11 in the connecting area between the margin 3 and supporting plate 11. The inside distance between the facing surfaces of supporting plate 11 and pressure element 13 is preferably smaller than the thickness of a diskette 1 in the area of the free resilient movable ends of pressure element 13, so the diskette is held with a clamping action between the pressure element 13 and supporting plate 11 due to the elasticity of the former. In the area facing margin 3, however, the inside distance between supporting plate 11 and pressure element 13 corresponds approximately to the thickness of diskette 1. In the connecting area between margin 3, supporting plate 11 and pressure element 13, a contact edge 14a that is parallel to margin 3 is formed by a connecting piece 14 that is at right angles to supporting plate 11. The pressure element is designed in the manner of a tongue but is narrower than receptacle 5 or diskette 1 so it extends over only part of connecting piece 14 in the middle. Side guides 15a, 16a whose measured vertical distance from each other is equal to or slightly larger than the width of diskette 1 are formed by two connecting pieces 15, 16 which are likewise normal to supporting plate 11 and run at right angles to connecting piece 14 or contact edge 4a. A side space is formed between the side connecting pieces 15, 16 and pressure element 13. Thus pressure element is designed so it has a spring elasticity preferably over its entire length beginning at connecting piece 14. Receptacle 5 into which diskette 1 can be inserted in the direction of arrow 17 is formed by supporting plate 11, pressure element 13, supporting edge 14a and side guides 15a, 16a. Due to the clamping method of holding diskette 1 between the supporting plate 11 and the pressure element 13 which preferably has an inclined insertion edge 18 pointing away from supporting plate 11 on its free end edge, diskette 1 is adequately secured to prevent it from unintentionally slipping out of receptacle 5.

Figure 8:
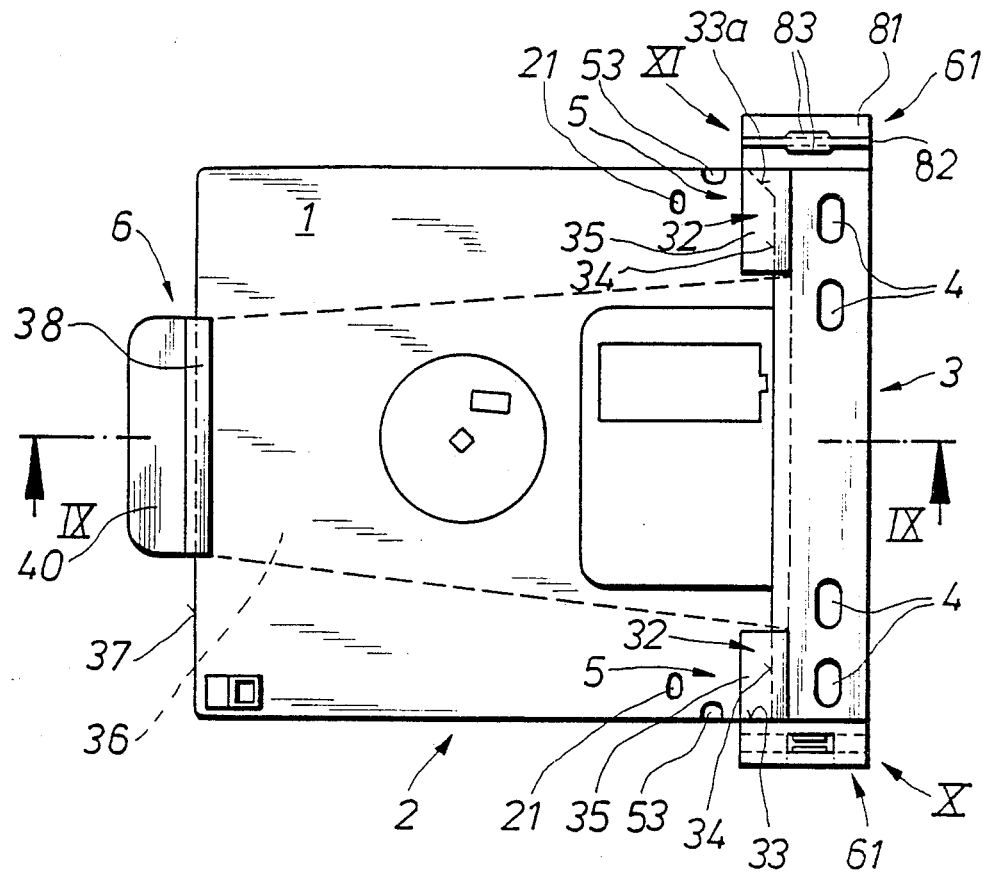
FIG. 8 shows a top view of a second version of the device according to this invention with a diskette inserted into it.
Figure 14:
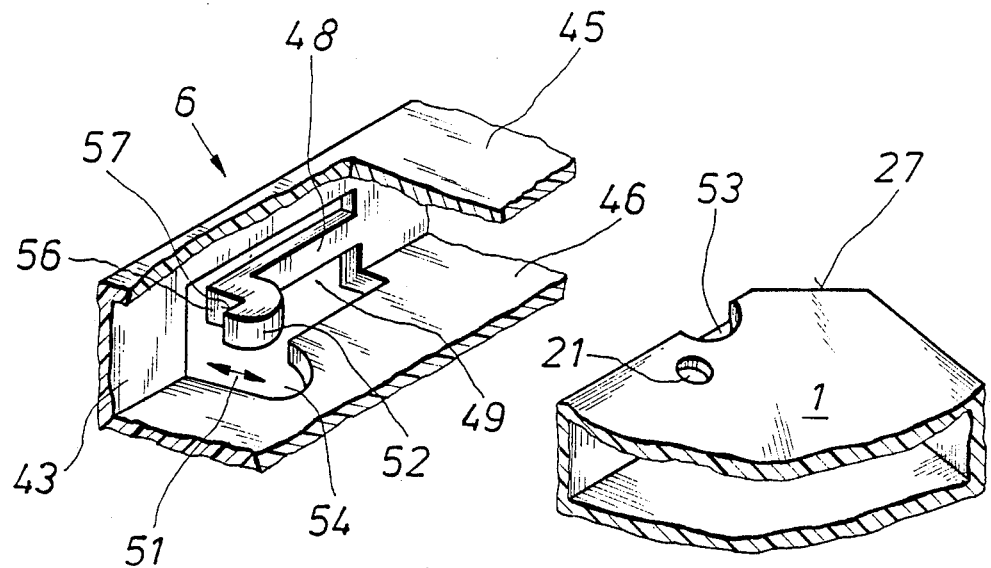
FIG. 14 shows a perspective view of an alternative version of area XIV in FIG. 13 from a different angle with the additional depiction of part of a diskette for storage.

In addition to this clamping method of securing the diskette, it is also provided according to this invention that the supporting plate 11 has at least one but preferably two catches 22 on the surface facing pressure element 13 where these catches engage in recesses 21 formed on one surface of diskette 1 (see FIGS. 8 and 14). These catches 22 according to FIG. 5 have inclined faces 23 on the side facing the opening side of receptacle 5, i.e., facing away from margin 3 to facilitate insertion of catches 22 into recesses 21 of diskette 1. Sides 24 of catches 22 opposite inclined faces 23 may also be tapered slightly—unlike the version shown here, where they are at right angles to supporting plate 11—in order to facilitate removal of diskette 1 from receptacle 5 in the direction opposite the direction of arrow 17. It is essential that the catches 22 are located in an area of supporting plate 11 at some distance from connecting piece 14 or contact edge 14a, because in this area elastic "yield" of the pressure element 13 in a direction at right angles to supporting plate 11 is possible so diskette 1 can first be guided over catches 22 before it enters the area of catches 22 with the recesses 21 and in this way is pressed by pressure element 13 against supporting plate 11. Diskette 1 is thus secured against unintentionally slipping out of receptacle 5 in any position of the device according to this invention due to the fact that the form fitting closure between its recesses 1 and catches 22 is maintained by the resilient elasticity of pressure element 13.

Thus, in the version according to FIGS. 1 to 7, holding devices 6 are formed on the one hand by the pressure element 13 in combination with supporting plate 11 and on the other hand by catches 22.

To produce the device according to this invention, supporting plate 11 has an opening 26 which corresponds in form approximately to the projection of pressure element 13. A molding tool can be passed through this opening 26 to shape the pressure element 13. Catches 22 are of course outside the area covered by the tongue-like pressure element 13.

The binder margin 3 in the example shown here is joined to connecting piece 14 that connects supporting plate to pressure element 13 (see FIG. 4). As already explained, however, it is within the scope of this invention to design binder margin 3 so it is in one plane with supporting plate 11, but as an alternative it can also be designed in a plane with pressure element 13.

Figure 2:
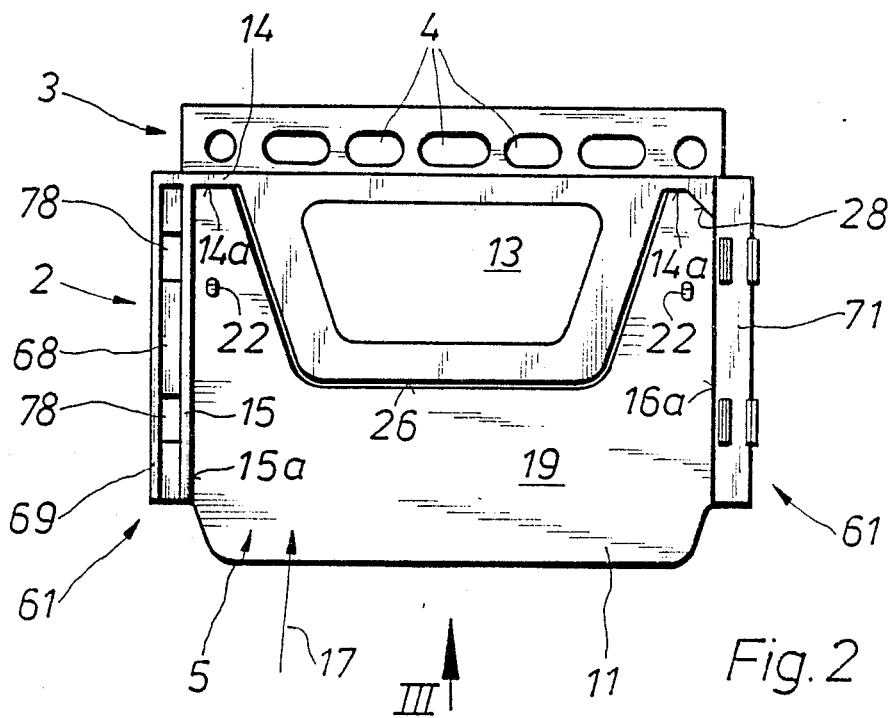
FIG. 2 shows a top view onto the front side of the device according to FIG. 1.
Figure 6:
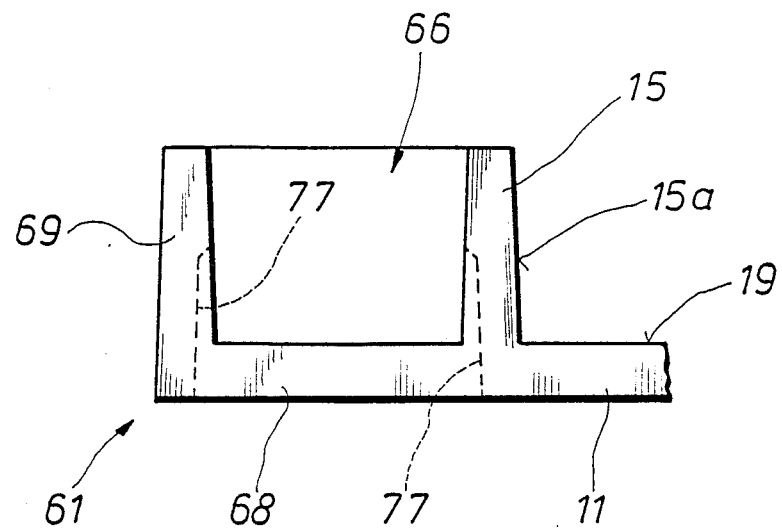
FIG. 6 shows an enlarged view of detail VI according to FIG. 3.
Figure 7:
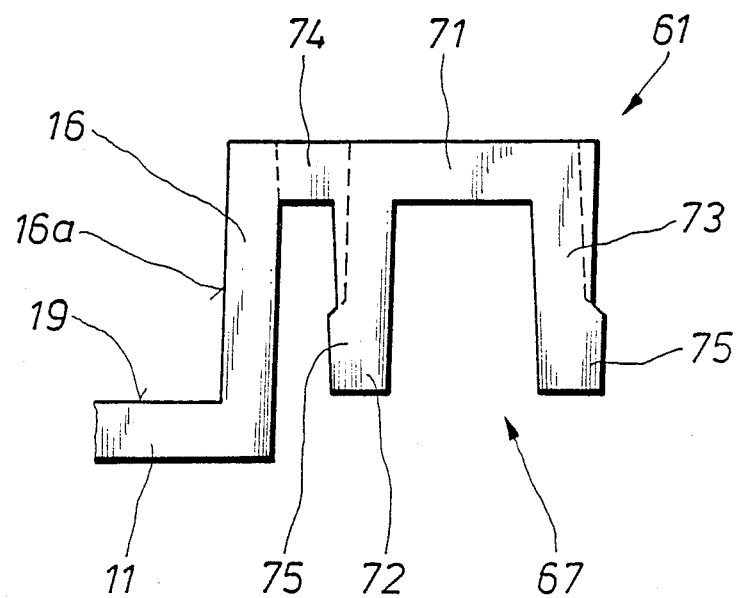
FIG. 7 shows an enlarged view of detail VII according to FIG. 3.

Since 3½ inch diskettes have a slant cut 27 at one corner (see FIG. 14), an inclined edge 28 that corresponds to the slant cut 27 of diskette 1 is also provided in the corner area between contact edge 14a and side guide 16a (see especially FIG. 2). This slant edge 28 as well as catches 22 are in the area between the side connecting pieces 15 and 16 and pressure element 13 so visual inspection from the outside is also possible to determine whether diskette 1 has been properly inserted, which also contributes to simple handling.

FIGS. 8 to 11 show a second version of the device according to this invention which also in this case consists of a holder part 2 and binder margin 3 with binder holes 4. The holder part 2 has one holding pocket 32 to hold a corner of diskette 1 at least in each of the two areas adjacent to the ends of binder margin 3. Each holding pocket 32 has a side stop 33, 33a, where side stop 33a is adapted to the slant edge 27 of diskette 1. In addition, each holding pocket 32 has a contact face 34 parallel to binder edge 3 and normal to the plane of the diskette to which a connecting piece 35 that reaches over diskette 1 is connected. A holding tongue 36 is attached to binder margin 3 in the middle area and extends parallel to the plane of the diskette at a distance from connecting pieces 35 that corresponds to the thickness of diskette 1. Thus in this practical example, a receptacle 5 is formed by holding pockets 32, i.e., side stops 33, 33a of contact face 34 and connecting pieces 35 as well as holding tongue 36.

Figure 9:
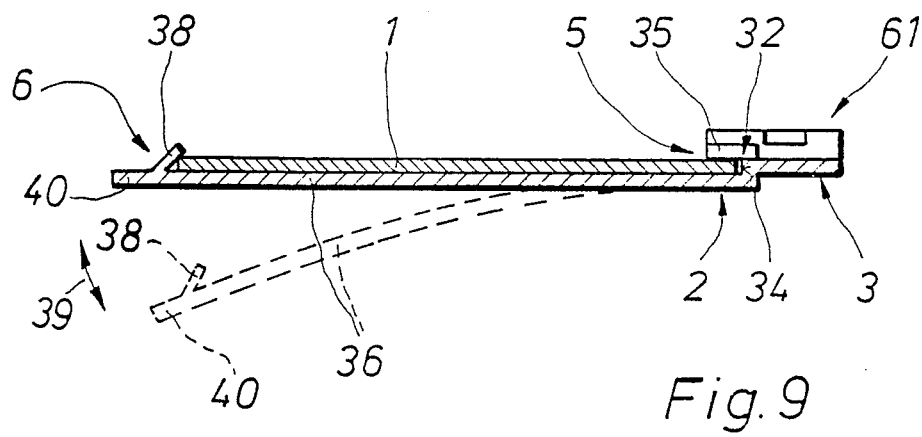
FIG. 9 shows a section along line IX—IX in FIG. 8.
Figure 10:
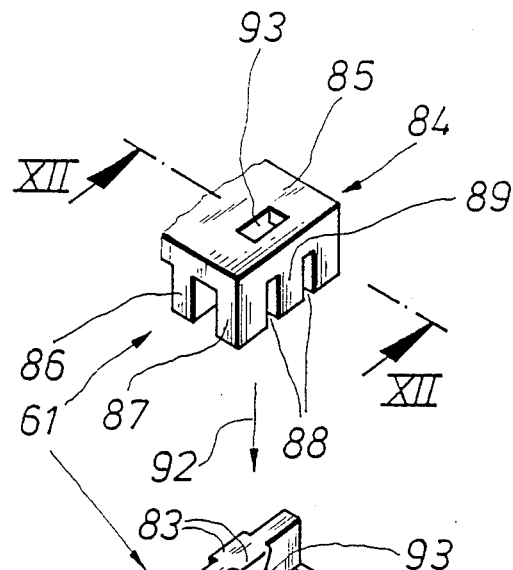
FIG. 10 shows a perspective view of detail X in FIG. 8.
Figure 11:
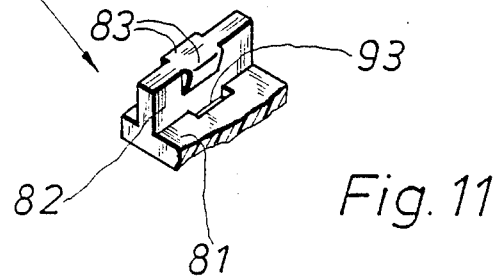
FIG. 11 shows a perspective view of detail XI in FIG. 8.
Figure 12:
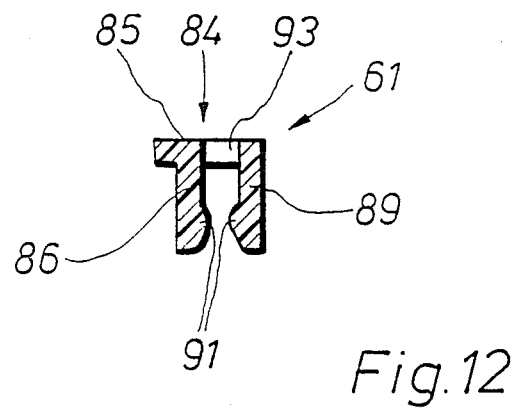
FIG. 12 shows a section along line XII—XII in FIG. 10.

The binder margin 3, which in the example shown according to FIG. 9 is in the plane of diskette 1 which is in turn approximately in the middle between holding tongue 36 and connecting pieces 35, can also be in a plane with holding tongue 36 or as an alternative it may be in a plane with connecting pieces 35.

Holding tongue 36 projects over the diskette 1 inserted into receptacle 5, i.e., its free end edge 37, and it has a holder connecting piece 38 in the area of its free end on the side facing diskette 1 where this connecting piece runs parallel to the free end edge 37 of diskette 1 and extends diagonally in the direction of binder margin 3 and receptacle 5. The holder connecting piece 38 reaches around or locks over the free end edge 37 of diskette 1 to secure diskette 1 in receptacle 5 as shown in FIG. 9. Thus in this practical example of the invention, holding tongue 36 together with holder connecting piece 38 forms the holding device 6 for securing diskette 1 in receptacle 5. For inserting or removing diskette 1 into or out of the device according to this invention, holding tongue 36 is designed so it can bend elastically in a direction approximately at right angles to the plane of the diskette, i.e., in the direction of double arrow 39 in FIG. 9. The inside distance from the holder connecting piece 38 and contact face 34 is preferably slightly smaller than the length of diskette 1, so the latter is secured with a clamping action. The end area of holding tongue 36 that extends beyond holder connecting piece 38 forms a handle strap 40 with which holding tongue 36 can be handled. Contrary to the version illustrated here, it is expedient for manufacturing purposes for the holder connecting piece 38 to be designed so it is narrower than holding tongue 36 and holding tongue 36 has an opening (not shown) in its area adjacent to holder connecting piece 38 in the direction of the binder margin 3 so a molding tool can be passed through the opening.

Figure 13:
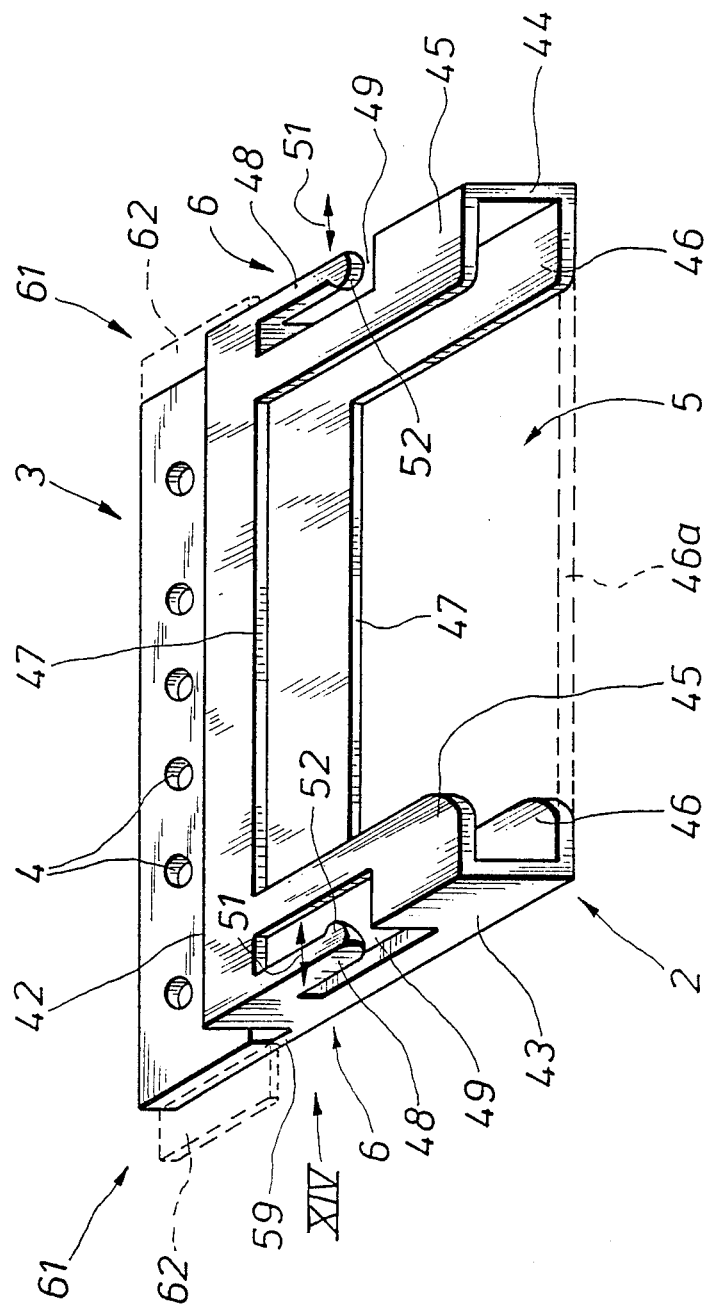
FIG. 13 shows a perspective view of another version of the device according to this invention.
Figure 15:
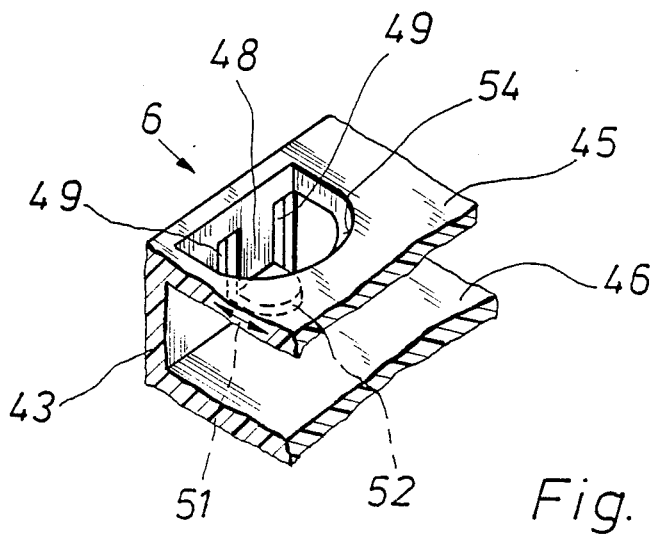
FIG. 15 shows a perspective view of another alternative version of area XIV according to FIG. 13 from the angle of view according to FIG. 14.

Again in the practical example according to FIGS. 13 to 15, the device according to this invention consists of the holder part 2 and the binder margin 3 with the punched holes 4. However, holder part 2 is designed essentially in a box shape to form receptacle 5 and consists of a bottom wall 42 that is parallel to the binder margin 3 and at right angles to the plane of the diskette, and also consists of two side walls 43, 44 at right angles to the bottom wall 42 and to the plane of the diskette plus two walls that run parallel to the diskette plane, namely an upper wall 45 and a lower wall 46. The box-shaped holder part 2 is designed so it is open on the side opposite bottom wall 42, thus forming receptacle 5 for insertion of diskette 1. The inside distance between side walls 43, 44 corresponds approximately to the width of diskette 1 and the inside distance between walls 45, 46 corresponds approximately to the thickness of diskette 1.

The upper and lower walls 45 and 46 may be designed so they are essentially rectangular, but it is advantageous if at least one of the walls 45, 46 has a recess 47 that is open at the edge in the direction of the open side of receptacle 5. This makes it possible to save material in an inexpensive manner. In the practical example of this invention illustrated in FIG. 13, each wall 45, 46 has a recess 47 but a continuous rectangular lower wall 46a is also shown with dotted lines as an example.

The holding devices 6 for securing diskette 1 inserted into receptacle 5 in this practical example are designed as catch spring arms 48 located in the area of at least one of side walls 43, 44. According to FIG. 13, catch spring arms 48 are formed by cutouts 49 in the area of both side walls 43, 44 in such a way that they are movable with a spring resiliency in a direction at right angles to the side walls 43, 44, i.e., in the direction of double arrow 51. Each catch spring arm 48 has a catch 52 on its free end that engages in a recess 53 that is open at the edge and is formed on diskette 1 (see FIG. 14). This yields an automatic snap action method of securing diskette 1 on insertion of diskette 1 into receptacle 5 of the holding part 2 according to this invention.

According to FIG. 13, the slot-shaped cutouts 49 in the direction parallel to the direction of insertion of diskette 1 through the upper wall 45 and are connected to the side walls 43, 44 in the area of the free end of catch spring arm 48. In the example according to FIG. 14 the cutouts 49 are located in the corner area between side walls 43 and 44 and lower wall 46 and likewise run parallel to the insertion direction of diskette 1. According to FIG. 15, the catch spring arms 48 are formed by slotted cutouts 49 that run from the lower wall 46 upward into the side wall 43 or 44 at right angles to the plane of the diskette.

To produce the device according to this invention, the upper and lower walls 45 and 46 have recesses 54 that are aligned with each other and with the catches 52 (see FIGS. 4 and 15) through which a molding tool can be inserted for shaping catches 52.

In another version of this invention as shown in FIG. 14, the catch spring arm 48 is equipped with a device to protect against overbending. This device is formed by a recess 56 on the free end of catch spring arm 48 in such a way that it has a stop face 57 that works together with the inside face of side wall 43 or 44.

The catch spring arms 48 can be located on both sides of diskette 1 as illustrated here, but it is also within the scope of this invention to provide a catch spring arm 48 on only one side and then a rigid catch on the other side.

In all practical examples illustrated in FIGS. 1 to 15, the binder margin 3 according to this invention can be connected to the holder part 2 by a film hinge 59, although this is shown only in FIG. 13. This film hinge 59 also permits a certain mobility of the holder part 2 even when the device according to this invention is bound or attached in a file.

In another version of this invention, the device has side connecting devices 61 for aligning several devices according to this invention side by side, in which case binder margins 3 are aligned with each other. This lateral alignment is possible on the basis of the arrangement of binder margin 3 according to this invention on the side edge of the holder part 2 opposite the insertion opening of receptacle 5 and across the direction of insertion of the diskette, and here again this provides the easy access described above.

FIG. 13 shows the simplest version of such a joining device 61. In this case the binder margin 3 has extensions 62 (shown with dotted lines) which form adhesive surfaces. Extensions 62 of two devices adjacent to each other at the side are glued together in an overlapping arrangement. It is important here to be sure that a lateral distance is provided between the two devices in order to permit the movement of catch arms 48. However, it is also within the scope of this invention to assure this movement through recesses in catch arms 48. Preferably extensions 62 have only half the material thickness of margin 3 so one of extensions 62 is in alignment with the top side of the binder margin and the other extension 62 is in alignment with the lower side of the binder margin. The overlapping extensions 62 that are joined together then have on the whole the thickness of binder margin 3 so this yields a continuous transition between two adjacent binder margins 3. Furthermore, it is advantageous if at least one of the extensions 62 has a self-adhesive coating.

In the practical example according to FIGS. 1 to 7, the side connecting devices 61 are designed as catches for detachable joining of several devices according to this invention. As shown especially in FIG. 3 in combination with FIGS. 6 and 7, a U section bar 66, 67 is formed on both sides of supporting plate 11. The U section bar 66 consists of the connecting piece 15 described above which forms the side guide 15a with a bottom connecting piece 68 on its lower end facing the supporting plate 11 and in alignment with the supporting plate 11 where this connecting piece is in turn connected to a leg 69 that is essentially parallel to connecting piece 15 (see FIG. 6). The U section bar 67 opposite bar 66 consists according to FIG. 7 of a connecting piece 71 and two legs 72, 73, where bar 67 is connected to the free end edge of the connecting piece 16 which is already described above and forms side guide 16a, by way of a connecting piece 74 that is in alignment with connecting piece 71 and is attached in the corner area between connecting piece 71 and leg 72. Legs 72, 73 extend essentially parallel to connecting piece 16, i.e., at right angles to supporting plate 11, and they also extend in the direction of supporting plate 11. Legs 72 and 73 each have a bar catch 75 on at least one point in their longitudinal extent on their outside surface. As shown in FIGS. 1 and 2, two bar catches 75 are provided per leg 72, 73 in the practical example shown here. The U section bar 66 according to FIG. 6 has undercut or recessed areas 77 (shown with a dotted line) on at least one location of its longitudinal extent, namely in the practical example shown here at two locations corresponding to the arrangement of bar catches 75 in sectional bar 67, where these undercut or recessed areas 77 are provided in the area of the inside faces of connecting piece 15 and leg 69 facing the supporting plate 11 and bottom connecting piece 68. To produce these recesses 77, bottom connecting piece 68 has a passage 78 (FIGS. 1 and 2) for each one. The space between legs 72, 73 of sectional bar 67 and the distance between leg 69 and connecting piece 15 of sectional bar 66 are coordinated in such a way that legs 72, 73 of sectional bar 67 of a first device according to this invention can be inserted into the sectional bar 66, i.e., between connecting piece 15 and leg 69, of a second device according to this invention. In doing so, bar catches 75 engage in recesses 77, so the adjacent devices can be joined so they snap together but are detachable. As already indicated in the example according to FIGS. 13 to 15, the devices thus joined, i.e., binder margins 6 and holder parts 2 are each in the same plane due to the advantageous design of the connecting devices 61 according to this invention, so together they can be bound in a single file, etc. The binder holes 4 are designed with regard to the hole spacings in such a way that it is possible to join them together in the manner of a notebook. If needed, however, it is also readily possible to separate the two devices again in order to remove a single diskette 1 together with the device holding it.

In the practical example according to FIGS. 8 to 12, the side connecting devices 61 are also designed as detachable catch mechanisms. As especially shown in FIGS. 8 and 11, at the end of binder margin 3 on one side and adjacent to the receptacle pocket 32 there is a strap 81 that is parallel to binder margin 3 or the plane of the diskette and is also provided with a connecting piece 82 that runs parallel to the direction of insertion of the diskette extending at right angles from its top side. One catch bar 83 is provided in the upper end area of connecting piece 82 in the middle on both sides. A U-shaped holding part 84 (FIG. 10) is provided on the opposite end of binder margin 3 and on the receptacle pocket 32 provided there and consists of a connecting piece 85 that is parallel to the plane of the diskette and two legs 86, 87 that are parallel to each other as well as parallel to the direction of insertion of diskette 1. Connecting piece 82 of strap 81 and legs 86, 87 of holding part 84 point in opposite directions. At least the outer leg 87 of holding part 84 facing away from binder margin 3 has a catch spring arm 89 formed by two slots 88 in the middle area. The catch spring arm 89 as well as the other leg 86 each have catches 91 on their opposite free ends (see FIG. 12). Holding part 84 of a first device can then be placed on connecting piece 82 of a second device in the direction of arrow 92 according to FIG. 10, in which case the catches 91 lock behind catch bars 83.

To produce the device according to this invention, strap 81 as well as connecting piece 85 of the holding part 84 have openings 93 through which molding tools to shape catch bars 83 and catches 91 can be inserted.

In another version of the device according to this invention which is not shown here, the binder margin 3 may have an elongated bead-like projection along its longitudinal edge facing away from the holder part 2, permitting insertion of the device in a filing cassette, for example. Sectional bars can be formed or provided in the cassette so the beadlike projection of the device according to this invention locks with these bars in such a way that a pivoting movement of the device is possible. On the basis of the arrangement of binder margin 3 described above, access to the diskette from above is possible in an advantageous manner.

The alignment side by side according to this invention makes it possible to insert and remove the diskette easily without hindrance due to the adjacent device, in which case each diskette can be removed as such or together with the device holding it detachably from the adjacent devices.

The present invention is not limited to the practical examples shown here but instead also includes all features that work together in the sense of this invention.

Thus, for example, the different designs of the holding part 2, receptacle 5, holding devices 6 and the side connecting devices 61 may be combined or replaced in any possible combination.

We claim:

1. Device for storing data diskettes in records and files such as folders or the like, comprising:

a flat holder part for one planar diskette;

a folder margin provided on one side edge of said holder part, said folder margin having folder holes;

said holder part having a receptacle for securing the diskette in the direction of three side edges thereof as well as in a direction perpendicular to the plane of the diskette;

said receptacle having an insertion opening on one side for insertion of the diskette into said receptacle and for removal of the diskette, respectively, in the direction of the diskette plane;

said holder part further having holding means for holding the diskette in said receptacle;

said holder part together with said folder margin forming a one-piece molded plastic part;

said folder margin being opposite said insertion opening and extending along said holder part one side edge transversely to the direction of insertion of the diskette; and said holding means comprising at least one catch for locking into a recess of the diskette as the diskette is inserted into the receptacle in the direction of the diskette plane.

2. Device according to claim 1 characterized in that said binder margin runs at right angles to the direction of insertion (17) of the diskette.

3. Device according to claim 1, characterized in that the receptacle (5) is formed by a flat substantially rectangular supporting plate (11) connected on one side to the binder margin (3), at least one tongue-shaped pressure element (13) connected to the supporting plate (11) so it is approximately parallel to the supporting plate (11) and is provided only on the side of the binder margin (3), a contact edge (14a) that is parallel to the binder margin (3), two side guides (15a, 16a) that are at right angles to the contact edge (14a), and between each of the side guides (15a, 16a) and the pressure element (13) a side space is formed over the entire length of the pressure elements.

4. Device according to claim 3, characterized in that the inside distance between the supporting plate (11) and the pressure element (13) is smaller in the area of the free end of the pressure element (13) than the thickness of the diskette (1) and corresponds approximately to the thickness of the diskette in the area facing the binder margin (3).

5. Device according to claim 3, characterized that the supporting plate (11) has at least one but preferably two catches (22), that can engage in recesses (21) formed on one planar face of the diskette (1), on the surface of the supporting plate (11) facing the pressure element (13) and especially in an area of the said surface at a distance from the binder margin (3).

6. Device according to claim 1, characterized in that the binder margin (3) is connected to the holder part (2) by a film hinge (59).

7. Device according to claim 1, characterized by side connecting devices (61) adjacent to the ends of the binder margin (3) for aligning several such devices at the sides.

8. Device according to claim 7, characterized in that the connecting devices (61) are designed for detachable joining of several such devices.

9. Device according to claim 8, characterized in that the connecting devices consist of U-shaped bars (66, 67) at the side parallel to the direction of insertion (17) of the diskette (1) with their legs (15, 69; 62, 73) at right angles to the plane of the diskette and pointing in opposite directions, in which case the inside distance between the legs (15, 69) of the first U section bars (66) is approximately equal to the outside distance between the legs (72, 73) of the second U section bar (67), and the legs (72, 73) of the second U section bar (67) have bar catches (75) on at least one location of their longitudinal extent on the outside faces and legs (15, 69) of the first U section bar (66) have recesses (77) for receiving the bar catches (75) to lock them at those locations of their longitudinal extent on their inside surfaces that correspond to the arrangement of the bar catches (75).

10. Device according to claim 1, characterized in that the binder margin (3) has at least one elongated bead-like projection on its longitudinal edge facing away from the holder part (2).

* * * * *